United States Patent [19]

Treybig et al.

[11] Patent Number: 4,765,839
[45] Date of Patent: Aug. 23, 1988

[54] BITUMINOUS COMPOSITIONS CONTAINING ANTI-STRIPPING ADDITIVES PREPARED FROM AMINES AND SUBSTITUTED HETEROCYCLIC COMPOUNDS

[75] Inventors: Duane S. Treybig, Lake Jackson; Dane Chang, Houston, both of Tex.

[73] Assignee: The Dow Chemical Company, Midland, Mich.

[21] Appl. No.: 123,009

[22] Filed: Nov. 19, 1987

[51] Int. Cl.$^4$ .................... C08L 95/00; C09D 3/24
[52] U.S. Cl. ............................ 106/273 N; 106/277; 106/281 N; 208/44; 252/311.5
[58] Field of Search ............... 106/273 N, 277, 281 N; 208/44; 252/311.5

[56] References Cited

U.S. PATENT DOCUMENTS

| | | | |
|---|---|---|---|
| 2,482,586 | 9/1949 | Hersberger et al. | 106/273 |
| 2,550,476 | 4/1951 | Hersberger | 106/273 |
| 2,705,714 | 4/1955 | Webb et al. | 260/250 |
| 2,759,840 | 8/1956 | Crews et al. | 106/273 |
| 2,759,841 | 8/1956 | Crews et al. | 106/273 |
| 2,766,132 | 10/1956 | Blair, Jr. et al. | 106/273 |
| 2,772,179 | 11/1956 | Kalinowski et al. | 106/273 |
| 2,901,372 | 8/1959 | Dybalski et al. | 106/273 |
| 2,919,204 | 12/1959 | Dybalski et al. | 106/273 |
| 2,937,106 | 5/1960 | Carpenter et al. | 106/273 |
| 3,259,512 | 7/1966 | Dickson et al. | 106/273 |
| 3,262,791 | 7/1968 | Dickson et al. | 106/14 |
| 3,317,447 | 5/1967 | Black et al. | 260/28.5 |
| 3,492,352 | 1/1970 | Miller, Jr. et al. | 260/570.8 |
| 3,502,723 | 3/1970 | Miller, Jr. et al. | 260/570.8 |
| 3,867,162 | 2/1975 | Elste, Jr. | 106/277 |
| 4,325,738 | 4/1982 | Plancher et al. | 106/273 N |
| 4,430,465 | 2/1984 | Abbott | 524/64 |
| 4,554,022 | 11/1985 | Grossi et al. | 208/44 |
| 4,579,593 | 4/1986 | Stanley | 252/311.5 |
| 4,677,146 | 6/1987 | Senz | 106/273 N |
| 4,724,003 | 2/1988 | Treybig et al. | 106/273 N |

OTHER PUBLICATIONS

"Aminolysis of Substituted Phenyl Quinoline-8- and -6- Carboxylates with Primary and Secondary Amines", by Bruice and Bruice, *J. Am. Chem. Soc.*, 96, pp. 5533–5542 (1974).
"The Function and Chemistry of Asphalt Compositions", *Proc. AAPT.*, vol. 24, pp. 374–391.
*Chem. Abstracts* 112984w, vol. 71, 1969 (Japan 69 12,739 published Jun. 9, 1969).
*Chem. Abstracts* 16217x, vol. 78, 1973, p. 398 (Japan 72 40,065 published Oct. 9, 1972).
"Experimental Chemotherapy of Tuberculosis. II. The Synthesis of Pyrazinamides and Related Compounds", by Kushner, Dalalian, Sanjurjo, Bach, Safir, Smith, Jr. and Williams, *J. Amer. Chem. Soc.*, 74, pp. 3617–3621 (1952).
"Notice concerning 5-Methyl- and 6-Methyl-2-Pyrazine-carboxylic Acid", Pitré, Boueri and Grabitz, *Chem. Ber.*, vol. 99, pp. 364–367 (1966).
"Synthesis of N-((2-((2-Amino-3,4-dihydro-4-oxo-6-pteridinyl)methyl)amino)-5-pyrazinyl)carbonyl)-L-glutamic Acid (2',5'-Diazafolic Acid)", by Nakahara, Sekikawa and Kakimoto, *J. Heterocyclic Chem.*, vol. 12, pp. 1073–1074 (1975).
"Synthesis of Novel Bis(amides) by Means of Triphenyl Phosphite Intermediates" by Barnes, Chapman, Vagg and Watton, *J. Chem. Eng. Data*, 23, pp. 349–350 (1978).
*Chem. Abstracts* 139627u, vol. 94, 1981 (Japan Kokai Tokkyo Koho 80 81,861 published Jun. 20, 1980 by Chugai Pharmaceutical Co., Ltd.).
"Polyazaheterocyclic Compounds: Condensation Reactions of Pyridazine-4,5-discarboxylic Acid Derivatives with o-Phenylenediamine" by Adembri, Chimichi, DeSio, Nesi and Scotton, *J. Chem. Soc. Perkin Trans. I*, 9, pp. 1022–1026 (1974).
"One-Step Conversions of Esters to 2-Imidazolines, Benzimidazoles, and Benzothiazoles by Aluminum Organic Reagents", by Neef, Eder and Sauer, *J. Org. Chem.*, 46, pp. 2824–2826 (1981).
"Synthesis of N-Methyl- and N,N-DimethylCarboxyamidopyridines and Their 1-Oxides", by Barczynski and Szafran, *Roczniki Chemii.*, 50, pp. 353–357 (1976).
"Synthesis of Some Substituted Picolinimidoyl Chloride Hydrochlorides", by Markued and Cronyn, *Acta Chemica Scandinavica Series B*, 32, pp. 231–234 (1978).

*Primary Examiner*—Paul Lieberman
*Assistant Examiner*—Helene Kirschner

[57] ABSTRACT

Bituminous compositions are improved by incorporating therein the reaction product of an organic amine with a substituted nitrogen-containing heterocyclic compound as an anti-stripping agent. These compositions are useful as a pavement material by blending with an aggregate.

12 Claims, No Drawings

BITUMINOUS COMPOSITIONS CONTAINING ANTI-STRIPPING ADDITIVES PREPARED FROM AMINES AND SUBSTITUTED HETEROCYCLIC COMPOUNDS

FIELD OF THE INVENTION

The present invention concerns anti-stripping additives for bituminous compositions.

BACKGROUND OF THE INVENTION

The use of petroleum residuum such as asphalt as a paving material and other construction material is well known. It is also well known that it is desirable to include in such compositions anti-stripping additives so as to reduce the tendency of the paving material which consists of the asphalt and an aggregate material from deteriorating during inclement weather conditions. During the winter months, the low temperatures tend to stiffen and reduce the flexibility of the asphalt binder in the paving material. Traffic loadings then cause the pavement to crack. When that happens, surface water can easily seep into the pavement. As the water goes through freeze-thaw cycles, it strips the asphalt from the aggregate surfaces, reduces the pavement's strength and accelerates deterioration. During the summer months, high temperatures can cause the asphalt pavement to become so soft that traffic can permanently deform the material and create shoving, rutting, bleeding and flushing problems. The incorporation of an anti-stripping additive into the asphalt composition employed in preparing the pavement increases the life of the pavement. It would be desirable to have anti-stripping additives for asphalt which improves its adhesion to the aggregate material.

SUMMARY OF THE INVENTION

The present invention pertains to a composition which comprises a blend of (I) bituminous material and (II) the product resulting from reacting at conditions sufficient to complete the reaction of (A) at least one aromatic heterocyclic compound having one or more rings, at least one heterocyclic nitrogen atom and containing at least one group attached to a carbon atom in the heterocyclic ring selected from (1) carboxylic acid,
(2) carboxylic acid ester,
(3) acyclic carboxylic acid anhydride,
(4) carboxylic acid halide or
(5) combination thereof; with (B) at least one organic amine compound containing at least one primary or secondary amine group or a combination of such groups; and wherein components (A) and (B) are present in quantities which provide a ratio of —CO— groups to —NH$_2$ or —NH— groups or combination of —NH$_2$ and —NH— groups of from about 0.1:1 to about 1.2:1; and wherein components (I) and (II) are employed in quantities which provide from about 0.05 to about 10 percent by weight of component (II) based upon the combined weight of components (I) and (II).

The present invention provides anti-stripping additives for asphalt which improves its adhesion to the aggregate material.

DETAILED DESCRIPTION OF THE INVENTION

The bituminous material and the anti-stripping agent are employed in amounts which suitably provide from about 0.05 to about 10, suitably from about 0.25 to about 5, more suitably from about 0.5 to about 2.5, most suitably from about 0.5 to about 1 percent by weight of the anti-stripping agent based upon the combined weight of the anti-stripping agent and the bituminous material.

The bituminous material employed herein in the practice of the present invention is not critical. Any bitumen, asphalt or crude residuum containing asphaltenes can be employed. U.S. Pat. No. 3,317,447 contains a good description of useful bituminous materials which are useful herein and is incorporated herein by reference. In general, the asphalts which can be employed include conventional petroleum asphalts, natural asphalts, gilsonite, air blown asphalts, coal tar and other similar materials. The asphalts are characterized by having penetration grades up to 300 as measured by ASTM Method D5. Preferred asphalts are the normal paving asphalts (e.g. AC5, AC10, AC20, and AC30. AC indicates asphalt cement and the number indicates the viscosity at 140° F. in poise divided by 100).

The anti-stripping agents employed in the present invention are prepared by reacting at least one nitrogen-containing aromatic heterocyclic compound having at least one group of either a carboxylic acid, carboxylic acid ester, carboxylic acid anhydride, carboxylic acid halide or their combination with an organic amine or mixture of such compounds at a temperature of from about 0° C. to about 300° C. The preferred temperature for the reaction of a nitrogen-containing aromatic heterocyclic compound having at least one group of carboxylic acid anhydride, carboxylic acid halide or their combination with an amine is from about 0° C. to about 150° C., most preferably from about 0° C. to about 100° C. The preferred temperature for the reaction of a nitrogen-containing aromatic heterocyclic compound having at least one group of carboxylic acid, carboxylic acid ester, or their combination with an amine is from about 150° C. to 250° C., most preferably from about 180° C. to 230° C. These reactions are carried out for a time period that is sufficient to complete the reaction. This time period is usually from about 10 minutes (600 s) to about 48 hours, preferably from about 30 minutes to about 12 hours, most preferably from about 30 minutes to about 2 hours. These reactions can be carried out near or in the presence of solvent. These reactions are usually conducted either under reduced pressure, atmospheric pressure or superatmospheric pressure is an inert atmosphere such as, for example, nitrogen, helium, neon, xenon, argon, mixtures thereof and the like. The reactants are employed in quantities which provide a ratio of —NH$_2$ or —NH— groups or a combination of such groups to —CO— groups suitably from about 0.1:1 to about 1.2:1, more suitably from about 0.75:1 to about 1.2:1, most suitably from about 0.9:1 to about 1.1:1.

Suitable nitrogen-containing heterocyclic compounds which can be employed to prepare the anti-stripping agents employed herein include, for example, those compounds represented by the following formulas

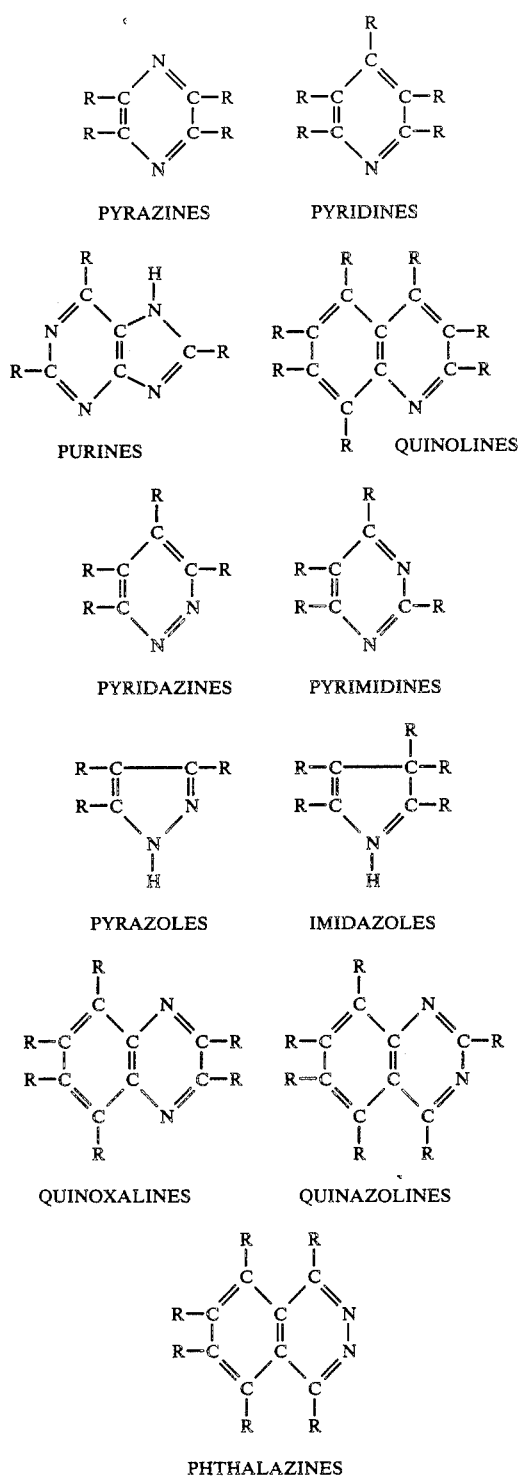

PYRAZINES  PYRIDINES

PURINES  QUINOLINES

PYRIDAZINES  PYRIMIDINES

PYRAZOLES  IMIDAZOLES

QUINOXALINES  QUINAZOLINES

PHTHALAZINES wherein each R is independently hydrogen, alkyl, aryl, aralkyl or alkaryl group having from 1 to about 10 carbon atoms, a hydroxyl, halogen, halogen substituted or —SH substituted alkyl group, dithio(—S—S) group, sulfur substituted alkyl group, mercapto group or a group represented by the formulas

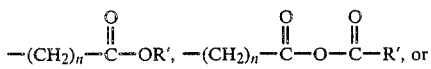

$$-(CH_2)_n-\overset{O}{\underset{\|}{C}}-OR', \quad -(CH_2)_n-\overset{O}{\underset{\|}{C}}-O-\overset{O}{\underset{\|}{C}}-R', \text{ or}$$

$$-(CH_2)_n-\overset{O}{\underset{\|}{C}}-X$$

wherein R' is hydrogen or an alkyl group having from 1 to about 20, suitably from about 1 to about 10, more suitably from about 1 to about 4, carbon atoms; X is a halogen, preferably chlorine or bromine; and n has a value from zero to 3; with the proviso, that at least one R group is a carboxylic acid, carboxylic acid ester, acyclic carboxylic acid anhydride, or a carboxylic acid halide group.

Particularly suitable nitrogen-containing aromatic heterocyclic compounds having at least one carboxylic acid group which can be employed herein include, for example, 2-pyrazinecarboxylic acid; 2,3-pyrazinedicarboxylic acid; 2,5-pyrazinedicarboxylic acid; 2,6-pyrazinedicarboxylic acid; 2,3,5,6-pyrazinetetracarboxylic acid; 5-methyl-2-pyrazinecarboxylic acid; 6-methyl-2-pyrazinecarboxylic acid; 5,6-dimethyl-2-pyrazinecarboxylic acid; 2-pyridinecarboxylic acid; 3-pyridinecarboxylic acid; 2,3-pyridinedicarboxylic acid; 2,6-pyridinedicarboxylic acid; 3,5-pyridinedicarboxylic acid; 5-butyl-2-pyridinecarboxylic acid; 3,5-dimethyl-2-pyridinecarboxylic acid; 6-chloro-2-pyridinecarboxylic acid; 3-mercapto-2-pyridinecarboxylic acid; 2,2'-dithiobis-3-pyridinecarboxylic acid; 6,6'-dithiobis-3-pyridinecarboxylic acid; 2-pyridineacetic acid; 3-pyridineacetic acid hydrochloride; 4-pyrimidinecarboxylic acid; 4,6-pyrimidinedicarboxylic acid; 3-pyrazinecarboxylic acid; 2-quinoxalinecarboxylic acid; 2-quinolinecarboxylic acid; 4-hydroxy-2-quinolinecarboxylic acid; 4,8-dihydroxy-2-quinolinecarboxylic acid; 1-isoquinolinecarboxylic acid; 4-cinnolinecarboxylic acid; 4-hydroxy-7-methyl-1,8-naphthyridine-3-carboxylic acid; 2-phenyl-4-quinolinecarboxylic acid; mixtures thereof and the like.

Particularly suitable nitrogen-containing aromatic heterocyclic compounds having at least one carboxylic acid ester group which can be employed herein include, for example, pyrazinecarboxylic acid methyl ester; pyrazinecarboxylic acid ethyl ester; 4-pyridinecarboxylic acid methyl ester; 4-methyl-3-pyridinecarboxylic acid methyl ester; 2-pyridinecarboxylic acid ethyl ester (2-ethylpicolinate); 2-pyridinecarboxylic acid butyl ester; 6-ethyl-2-pyridinecarboxylic acid ethyl ester; 3,6-dichloro-2-pyridinecarboxylic acid methyl ester; 2-pyridineacetic acid methyl ester; 6-methyl-2-pyridineacetic acid methyl ester; 4-pyrimidinecarboxylic acid methyl ester; 5-methyl-2-pyrimidinecarboxylic acid methyl ester; 4-chloro-2-(methylthio)-5-pyrimidinecarboxylic acid ethyl ester; 4-pyridazinecarboxylic acid methyl ester; 3-hydroxy-4-quinolinecarboxylic acid methyl ester; 8-hydroxy-4-quinolinecarboxylic acid methyl ester; 4-hydroxy-7-(trifluoromethyl)-3-quinolinecarboxylic acid ethyl ester; 2-hydroxy-1,8-naphthyridine-3-carboxylic acid methyl ester; mixtures thereof and the like.

Particularly suitable nitrogen-containing aromatic heterocyclic compounds having at least one acyclic carboxylic acid anhydride group which can be employed herein include, for example, pyrazinecarboxylic acid anhydride, 2-pyridinecarboxylic acid anhydride, 4-pyridinecarboxylic acid anhydride, 2-pyrazinecarboxylic acid anhydride with acetic acid; 2-pyrazinecarboxylic acid anhydride with propanoic acid; 2- pyridinecarboxylic acid anhydride with acetic acid; 2-pyridinecarboxylic acid anhydride with propanoic acid; pyrazinecarboxylic acid anhydride with methyl hydrogen carbonate; pyrazinecarboxylic acid anhydride with ethyl hydrogen carbonate; 2-pyridinecarboxylic acid anhydride with methyl hydrogen carbonate; 2-pyridinecarboxylic acid anhydride with ethyl hydrogen carbonate; mixtures thereof and the like.

Particularly suitable nitrogen-containing aromatic heterocyclic compounds having at least one carboxylic acid halide group which can be employed herein include, for example, 2-pyrazinecarbonyl chloride; 2-pyridinecarbonyl chloride; 2-pyridinecarbonyl chloride hydrochloride; 3-pyridinecarbonyl chloride; 3-pyridinecarbonyl bromide; 4-pyridinecarbonyl chloride; 4-pyridinecarbonyl chloride hydrochloride; 2,3-pyridinedicarbonyl dichloride; 2,5-pyridinedicarbonyl dichloride; 2,6-pyridinedicarbonyl dichloride; 3,5-pyridinedicarbonyl dichloride; 4,6-pyridinedicarbonyl dichloride, mixtures thereof and the like.

Suitable amine compounds which can be reacted with the nitrogen-containing heterocyclic compounds to prepared the anti-stripping agents employed herein include those represented by the following formulas

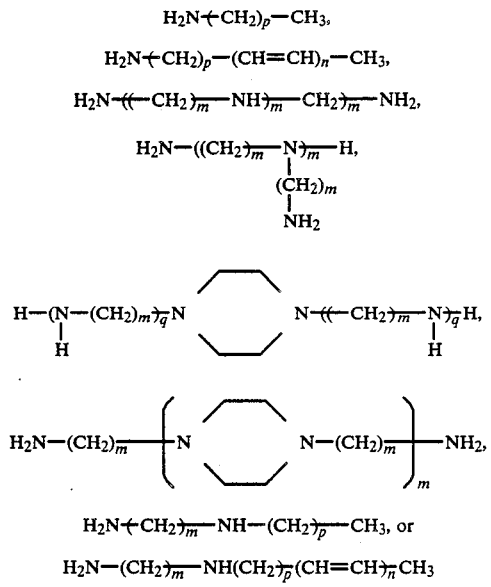

wherein each m independently has a value from 1 to about 10; each n independently has a value from 1 to about 5; each p independently has a value from 7 to about 72; each q independently has a value from zero to about 10; and wherein the carbon-carbon double bond (—CH=CH—) is located anywhere through the saturated hydrocarbon chain ((—CH$_2$)$_p$).

Suitable such amines which can be employed herein include those having from about 4 to about 70, preferably from about 10 to about 24, carbon atoms such as, for example, N,N-dibutyl-1,3-propanediamine, N,N'-dipropyl-1,7-heptanediamine, N,N'-dioctyl-1,2-ethanediamine, N,N'-dioctyl-1,3-propanediamine, N,N-didecyl-1,3-propanediamine, 1,10-dodecanediamine, 1,12-dodecanediamine, 5,11-pentadecanediamine, 4,13-hexadecanediamine, 2,2,11-trimethyl-1,11-dodecanediamine, 5,13-diethyl-6,12-heptadecanediamine, 3,4-diethyl-4,13-hexadecanediamine, 12-ethyl-2-methyl-2-propyl-1,11-tetradecanediamine, 5,15-diethyl-5,14-nonadecanediamine, N-hexyl-1-hexanamine, N-octyl-1-octanamine, N-nonyl-1-nonanamine (Di-n-nonylamine), N-(2-aminoethyl)-1,2-ethanediamine, N-(3-aminopropyl)-1,4-butanediamine, N-(2-aminoethyl)-1,4-butanediamine, N-(3-aminopropyl)-1,3-propanediamine, bis-(2-aminopropyl)amine, 1-piperazineethanamine, 2-(3-aminopropylamino)ethanol, diethylenetriamine, triethylenetetramine, tetraethylenepentamine, pentaethylenehexamine, hexaethyleneheptamine, 3-isopropoxypropylamine, 3-(2-methoxyethoxy)propylamine, N-(3-ethoxypropyl)ethylamine, 4,4-diethoxybutylamine, 1-(2-aminoethylamino)-2-propanol, 6,9,12-trioxa-3,15-diazaheptadecane-1,17-diol, 3,6,9,12,15-pentaoxaheptadecane-1,17-diamine, N-[3-(decyloxy)propyl]-1,3-propanediamine, 1-[(2-aminoethyl)amino]-2-tetradecanol, 1-[(3-aminopropyl)amino]-2-dodecanol, 5,5'-oxybis-1-pentanamine, 5-[(3-ethylamino)propylamino]-1-pentanol, 1-piperazinepropanol, cyclohexanebutylamine, cyclooctylamine, cyclododecylamine, N-methylcyclododecylamine, 4-hexyloxyaniline, 4-pentyloxyaniline, 1,4-benzodioxan-6-amine, 2-amino-4-tert-butylphenol, 2-biphenylamine, 4-biphenylamine, 2-aminonaphthalene, 2-fluoroenamine, 1-anthramine, 4-phenylbutylamine, 2-(benzyloxy)ethylamine, 2-(β-phenethylamino)ethanethiol, 4-amino-1-benzylpiperidine, tall oil amine, soya amine, hydrogenated tallow amine, tallow amine, $C_8$–$C_{15}$ ether amine, ether-1,3-propylenediamines (Adogen ether amines), ether-1,2-ethylenediamines, N-alkyl-1,3-propylenediamines (Adogen fatty diamine), N-alkyl-1,2-ethylenediamines, partially alkoxylated or partially polyalkoxylated amines or polyamines, aminated polyoxyalkylene polyols, mixtures thereof and the like. Particularly suitable amines include 1-hexanamine(hexylamine), 1-heptanamine, 1-octanamine, 1-nonanamine, 1-decanamine, 1-undecanamine, 1-dodecanamine (dodecylamine), 1-tridecanamine, 1-tetradecanamine, 1-pentadecanamine, 1-hexadecanamine, 1-heptadecanamine, 1-octadecanamine, N-methylhexanamine, N-methylheptanamine, N-methyl-1-decanamine, N-(1-methylethyl)-1-pentanamine, N-(1-methylethyl)-1-decanamine, N-methyl-1-octadecanamine, N-dodecyl-1-dodecanamine, N-decyl-1,2-ethanediamine, N-undecyl-1,2-ethanediamine, N-tridecyl-1,2-ethanediamine, N-pentadecyl-1,2-ethanediamine, N-hexadecyl-1,2-ethanediamine, N-heptadecyl-1,2-ethanediamine, N-octadecyl-1,2-ethanediamine, N-decyl-1,3-propanediamine, N-dodecyl-1,2-propanediamine, N-tetradecyl-1,3-propanediamine, N-hexadecyl-1,3-propanediamine, N-heptadecyl-1,3-propanediamine, N-octadecyl-1,2-propanediamine, N-octadecyl-1,3-propanediamine, N-octadecyl-1,4-butanediamine, 9-octadecen-1-amine, 9,12-octadecadien-1-amine, 9,12,15-octadecatrien-1-amine, 9-eicosen-1-amine, 11-eicosen-1-amine, mixtures thereof and the like.

If desired, the resultant reaction product can be reacted or neutralized with a mineral acid or an organic acid at a temperature from 25° C. to 300° C., the preferred temperature range with organic acid is from 150° C. to 230° C. These reactions can be carried out under reduced pressure if desired. The mineral or carboxylic acid is employed in an amount which provides a ratio of moles of mineral acid or carboxylic acid to reactive amine hydrogen atom present in the above reaction product suitably of from about 0.1:1 to about 2:1, more suitably from about 0.75:1 to about 1.5:1, most suitably from about 0.9:1 to about 1.1:1.

Suitable organic acids which can be employed herein include those represented by the following formulas I, II or III

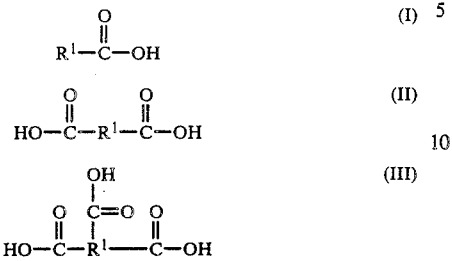

wherein $R^1$ is a hydrocarbyl group or a sulfur, halogen, nitro or hydroxyl substituted hydrocarbyl group having from about 1 to about 36 carbon atoms, suitably from about 1 to about 24 carbon atoms, more suitably an alkyl group having from about 1 to about 6 carbon atoms. The term hydrocarbyl as employed herein includes alkyl, cycloalkyl, aryl, aralkyl, alkaryl, alkenyl and the like.

Suitable carboxylic acids which can be employed herein include, for example, heptanoic acid, octanoic acid, nonanoic acid, decanoic acid, undecanoic acid, dodecanoic acid (lauric acid), tridecanoic acid, tetradecanoic acid (myristic acid), pentadecanoic acid, hexadecanoic acid (palmitic acid), heptadecanoic acid, octadecanoic acid (stearic acid), nonadecanoic acid, eicosanoic acid, heneicosanoic acid, docosanoic acid, tricosanoic acid, tetracosanoic acid, tricontanoic acid, 2-propylpentanoic acid, 2-ethylhexanoic acid, 5-methyl-2-(5-methylhexyl)decanoic acid, 8-methylheptadecanoic acid, 3-methylpentadecanoic acid, 2-octenoic acid, trans-9-octadecenoic acid (elaidic acid), 12-octadecenoic acid, 9,12-octadecadienoic acid (linoleic acid), 13-docosenoic acid (erucic acid), 2,4-hexadienoic acid, 9,12,15-octadecatrienoic acid (linolenic acid), 5,8,11,14-eicosatetraenoic acid (arachidonic acid), 3,5-tetradecadienoic acid, 6-hexadecenoic acid, 3-hexyl-3-decenoic acid, 5,8-hexadecadienoic acid, 2-hydroxyl-1,2,3-nonadecanetricarboxylic acid (agaricic acid), 11-bromoundecanoic acid, 2-bromohexadecanoic acid, 12-nitrododecanoic acid, 16-hydroxyhexadecanoic acid, 4-hydroxyoctadecanoic acid 12-hydroxyoctadecanoic acid (DL-12-hydroxystearic acid), 4,4'-dithiobisbutanoic acid, decanedioic acid (sebacic acid), undecanedioic acid, dodecanedioic acid, tridecanedioic acid, tetradecanedioic acid, hexadecanedioic acid, trans-4-pentyl cyclohexanecarboxylic acid, cyclohexanebutanoic acid, cyclohexanehexanoic acid, 3-methyltricyclo(3.3.1.1$^{3,7}$)-decane-1-acetic acid, benzenebutanoic acid, benzenehexanoic acid, 11-phenoxyundecanoic acid, tall oil fatty acids, rosin acid, dimer acids such as Westvaco Diacid 1550, Empol 1010 dimer acid and Empol 1016 dimer acid, trimer acids such as Empol 1040 trimer acid, polycarboxylic acids such as Empol 1052 polybasic acid, mixtures thereof and the like. Particularly suitable organic acids include formic acid, acetic acid, propionic acid, butyric acid, hexanoic acid, acrylic acid, crotonic acid and the like. Hydrochloric acid, sulfuric acid, phosphoric acid and the like are suitable mineral acids.

If desired, the compositions of the present invention can be prepared in the presence of one or more solvents. Suitable such solvents include, for example, cyclic ethers, amides, furans, hydrocarbons, nitrogen-containing aromatic heterocycles, combinations thereof and the like. Particularly suitable solvents include, for example, tetrahydrofuran, dimethylformamide, dimethylacetamide, dioxane, benzene, toluene, pyridine, combinations thereof and the like.

The following examples are illustrative of the invention, but are not to be construed as to limiting the scope thereof in any manner.

EXAMPLE 1

Pyrazinecarboxylic acid (12.56 grams, 0.10 mole) and ADOGEN 572 (30.68 grams, 0.095 mole) are weighed into a 4-neck 250 milliliter round bottom flask equipped with a mechanical stirrer, condenser, Barrett Trap, and temperature recording device. ADOGEN 572 is primarily a mixture of octadecen-1-amine and octadecene-1,3-propanediamine commercially available from Sherex Chemical Co., Inc.

The reactor contents are purged with nitrogen. The mixture is stirred and heated gradually to 230° C. for an additional 105 minutes. A dark red brown viscous liquid (37.32 grams) is recovered from the reactor and an aqueous solution of pyrazine (3.65 grams) is collected from the Barrett Trap.

Infrared spectroscopy supports the presence of a secondary amide, methylene groups and no free 2-pyrazine carboxylic acid. Multiple bands between 3000 cm$^{-1}$ and 3400 cm$^{-1}$ are assigned to the NH stretching vibration of a secondary amide. The intense absorption band at 1676 cm$^{-1}$ is attributed to the carbonyl stretching vibration of a secondary amide. The band at 1530 cm$^{-1}$ is attributed to the N—H bending vibration of a secondary amide. Absorption bands at 722 cm$^{-1}$, 1470 cm$^{-1}$, 2855 cm$^{-1}$ and 2925 cm$^{-1}$ supports the presence of methylene groups.

Flame ionization capillary gas chromatography indicates that 80% of the initial fatty amines are converted to amide products containing the pyrazine nucleus.

EXAMPLE 2

Pyrazinecarboxylic acid (31.03 grams, 0.25 mole), tributylamine (44.6 grams, 0.24 mole) and dioxane (391.03 grams, 4.44 moles) are added to a one-liter resin kettle equipped with a thermometer, mechanical stirrer, condenser and addition funnel. The mixture is cooled to 6° C. while stirring by using a sodium chloride-ice bath. Ethylchloroformate (27.15 grams, 0.25 mole) is added slowly with an addition funnel over a 61 minute period. Upon completion of the addition of ethylchloroformate, the mixture is warmed to 15° C. to allow dissolution of the solids, then cooled to 5° C. to give a chilled dioxane solution of pyrazinecarboxylic acid anhydride with ethyl hydrogen carbonate. KEMAMINE P-999 (69.88 grams, 0.25 mole) in dioxane (650 grams, 7.38 moles) is added slowly to the chilled dioxane solution of pyrazinecarboxylic acid anhydride with ethyl hydrogen carbonate over 330 minutes at 5° C. to 7° C. KEMAMINE P-999 is a mixture of $C_{16}$–$C_{20}$ primary amines commercially available from Witco Chemical Corporation which consist primarily of 1-hexadecanamine, 1-octdecanamine, 9-octadecen-1-amine, 9,12-octadecadien-1-amine, 9,12,15-octadecatrien-1-amine and 9-eicosen-1-amine. The resultant yellow-orange reaction product is rotary evaporated under full vacuum at boiling water temperature. The mass yield of product is 92%.

The infrared spectrum of the product supports the presence of a secondary amide, methylene groups and free pyrazinecarboxylic acid. Multiple bands between 3000 cm$^{-1}$–3400 cm$^{-1}$ are assigned to the NH stretching vibration of a secondary amide. The band at 1670 cm$^{-1}$ is assigned to the carbonyl stretching vibration (Amide I band) of a secondary amide. Absorption bands at 713 cm$^{-1}$, 1470 cm$^{-1}$, 2852 cm$^{-1}$ and 2925 cm$^{-1}$ supports the presence of methylene groups. The absorption band at 1725 cm$^{-1}$ is attributed to dimeric carboxylic carbonyl stretch.

The following pyrazineamides are identified by capillary gas chromatography-mass spectrometry,

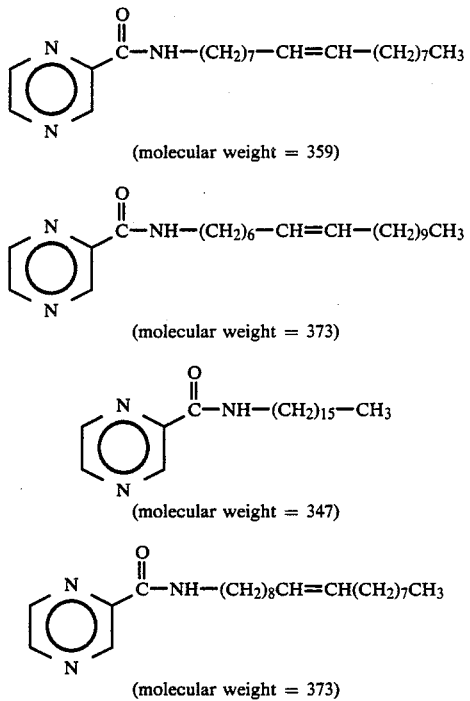

The carbon-carbon double bonds in the above structures could be located anywhere in the alkyl chains.

EXAMPLE 3

4-Pyridinecarbonyl chloride hydrochloride (53.6 grams, 0.3 mole) is weighed into a 4-neck 250 milliliter round bottom flask equipped with a mechanical stirrer, condenser, Barrett trap and temperature recording device. The reactor system is blanketed with nitrogen. KEMAMINE P-650 (65.8 grams, 0.3 mole) is added to the 4-pyridinecarbonyl chloride hydrochloride with an addition funnel over a 75 minute period. KEMAMINE P-650 is a mixture of $C_{10}$–$C_{18}$ primary amines commercially available from Witco Chemical Corp. which consists primarily of 1-decanamine, 1-dodecanamine, 1-tetradecanamine, 1-hexadecanamine, 1-octadecanamine and octadecen-1-amine. Dioxane (50 milliliters) is then added to the reactor contents. Dioxane and water are removed with a Barrett trap as the temperature is incrementally increased to 235° C. over an 85 minute period. A soft brown solid (105.56 grams) is recovered from the reactor.

EXAMPLE 4

The soft brown solid (30.08 grams) from Example 3 is added to a 1-liter beaker. Sodium hydroxide (12.28 grams, 0.31 mole) and water (65.27 grams, 3.62 moles) are added to the beaker. The contents of the beaker are stirred at boiling water temperature for 10 minutes. A brownish solid precipitated from the solution at room temperature. The brown solid is extracted with chloroform (500 milliliters). The chloroform is removed by rotary evaporation under full vacuum. Isopropanol is added to the solid and removed by rotary evaporation under full vacuum to give a fatty light tan solid (28.11 grams).

EXAMPLE 5

2-Pyridinecarboxylic acid (48.08 grams, 0.34 mole) is weighed into a reactor of the type described in Example 3. Anhydrous isopropanol is added to the 2-pyridinecarboxylic acid to form a stirrable slurry. Triethylenetetramine (33.32 grams, 0.23 mole) is added to the reactor contents by using an addition funnel at 83° C. over a 152 minute (9120 s) period. Isopropanol and water are removed by using the Barrett trap. The temperature is increased to a maximum of 235° C. over a 110 minute (6600 s) period. A light beige viscous liquid (64.2 grams) is recovered from the reactor. This liquid is subjected to simple distillation at a head temperature of 190° C. and 3.5 mm mercury vacuum giving a light golden brown viscous liquid (44.94 grams). Capillary gas chromatography of the light golden brown liquid indicated the absence of unreacted triethylenetetramine or 2-pyridinecarboxylic acid.

EXAMPLE 6

The light golden brown viscous liquid (10.57 grams, 0.04 mole) from Example 5 is weighed into a reactor of the type described in Example 3. Anhydrous isopropanol (16.17 grams) is added to the reactor contents of facilitate stirring. Then 37% hydrochloric acid (16.67 grams, 0.17 mole) is added dropwise by using an addition funnel. The reactants are heated to 80° C. for 30 minutes. Isopropanol and water are removed with a Barrett trap. The reaction product is heated under a vacuum of 3.5 mm mercury for an additional 15 minutes at 90° C. The final product is a light pink taffy-like solid (16.51 grams).

EXAMPLE 7

The light golden brown viscous liquid (10.09 grams, 0.04 mole) from Example 5 is weighed into a reactor of the type described in Example 3. Glacial Acetic Acid is added dropwise to the reactor contents over a five minute period by using an addition funnel. The reactor contents are heated to 125° C. for 15 minutes giving a yellow brown viscous liquid (19.82 grams). Then the reactor contents are heated to 235° C. over a period of 120 minutes giving a dark brown solid.

EXAMPLE 8

The above prepared anti-stripping additives or agents are mixed with asphalt and the resultant blend is then mixed with an aggregate and subjected to a boil test and a freeze-thaw test. In these tests, AC-20 type asphalt obtained from Texas Cosden Oil & Chemical Co. is employed. Four siliceous aggregates which have shown signs of serious stripping problems are tested. The names and the origins and silicon contents of these aggregates are:
Helms (Nevada, 63% Si)
Gifford-Hill (Bryan, Tex., 100% Si)
Waco (Waco, Tex., 98% Si)
Davidson (Georgia, 81% Si)

DESCRIPTION OF TESTS

Boil Test

Preparation of Mixtures—In order to minimize the effect of aggregate interlock while maximizing the bond between the aggregate and the asphalt cement, each individual aggregate is first wet sieved to obtain the portion that passes No. 8 sieve and retained on No. 20 sieve (U.S. standard testing sieve series, ASTM E-11). Then 100 g of this size dry aggregate is heated to 160° C. plus or minus 3° C. for at least 2 hours. The asphalt cement (6 g) with 30 mg (0.5 wt.%) or 60 mg (1.0 wt.%) of anti-stripping additive is heated and stirred at 160° C. for 5 minutes. At the appropriate time, the hot dry aggregate is poured into the asphalt and mixed manually on a hot plate as rapidly and thoroughly as possible for 5 minutes. This mixture is then allowed to cool at room temperature for at least 2 hours before testing.

Test Procedure—A 1-liter beaker is filled with 500 ml deionized water and heated to boiling. The prepared aggregate-asphalt mixture is added to the boiling water which temporarily lowers the temperature below the boiling point. The heat is then increased so that the water reboiled in approximately 2 to 3 minutes. The water is maintained at the boiling temperature for 10 minutes while stirring with a glass rod at 3-minute intervals. During and after boiling, the stripped asphalt is skimmed away from the water surface with a paper towel to prevent recoating the aggregate. The mixture is then poured onto a paper towel and allowed to dry. The amount of asphalt retained on the mixture is determined by visual rating expressed in terms of percent of retained asphalt. To standarize this evaluation, a set of 10 sample mixtures representing a scale of from 0 to 100 percent asphalt retention is prepared. By referring to these standard mixtures, the percent of asphalt retained on the aggregate is determined. An additive is considered to pass the boil test when an aggregate retains more than 70% of the original quantity of the mixture of additive and asphalt previously coated onto the aggregate.

Freeze-Thaw Test

Preparation of Mixtures—In order to minimize the effect of aggregate interlock while maximizing the bond between the aggregate and the asphalt cement, each individual aggregate is first wet sieved to obtain the portion that passes No. 20 sieve and retained on No. 35 sieve (U.S. standard testing sieve series, ASTM E-11). Then 46 g of this aggregate is heated at 160° C. plus or minus 3° C. for at least 2 hours. Three grams of asphalt cement containing 15 mg (0.5 wt.%) or 30 mg (1.0 wt.%) of the anti-stripping additive is mixed at 160° C. for 5 minutes. At the appropriate time, the hot aggregate is added to the asphalt and manually mixed as thoroughly and rapidly as possible for 5 minutes. This mixture is then allowed to cool at room temperature for over 30 minutes before compaction of the specimen is begun. The specimen is then compacted by reheating the asphalt concrete mixture at 150° C. for 20 minutes, then transferring the mixture to a steel molding cylinder with a 41.33 mm inside diameter and compacting by applying a constant load of 6200 lbs (2812.32 kg) which corresponds to a force of 27.6 kN for 7 minutes. Generally, 46 g of each individual aggregate will produce a compacted briquet with a uniform height of 19.05 mm, plus or minus 0.127 mm. After compaction, the briquet is extracted from the mold and allowed to cool and cure at room temperature for two days before freeze-thaw cycling.

Test Procedure—The briquet is placed on a cone shaped stress pedestal with only the center of the briquet bottom touching the pedestal. This entire assembly is then placed in a jar with enough distilled water to fill the jar to about one-half inch (12.7 mm) above the test briquet. The jar is then placed in a freezer at a temperature of −12° C. for 15 hours. After this period, the jar is then transferred to a 50° C. oven for 9 hours. At the end of each complete freeze-thaw cycle, the briquet is carefully examined for the appearance of surface cracks. If no cracks are visible, the briquet is subjected to subsequent freeze-thaw cycles until cracks are observed or the test terminated. An additive is considered to pass the freeze-thaw test when the briquet with additive passed more freeze-thaw cycles than the briquet with no additive.

TABLE I

| RUN NO. | ADDITIVE TYPE | AGGREGATE/ TYPE | BOIL TEST %[a] | FREEZE-THAW TEST[b] |
| --- | --- | --- | --- | --- |
| A* | None | Helms | N.T.[c] | 9 |
| B | Ex. 1[e] | Helms | N.T. | 30 |
| C* | None | Gifford-Hill | 40 | 6 |
| D | Ex. 1[e] | Gifford-Hill | N.T. | 30 |
| E | Ex. 2[d] | Gifford-Hill | 70 | 10 |
| F | Ex. 4[d] | Gifford-Hill | 70 | 8 |
| G | Ex. 6[d] | Gifford-Hill | 95 | 13 |
| H | Ex. 7[d] | Gifford-Hill | 90 | 13 |
| I* | None | Waco | 5 | 7 |
| J | Ex. 2[d] | Waco | 80 | 15 |
| K | Ex. 4[d] | Waco | 60 | 10 |
| L | Ex. 6[d] | Waco | 100 | 20 |
| M | Ex. 7[d] | Waco | 100 | 16 |
| N* | None | Davidson | 5 | 6 |
| O | Ex. 2[d] | Davidson | 35 | 12 |
| P | Ex. 4[d] | Davidson | 40 | 12 |
| Q | Ex. 6[d] | Davidson | 95 | 16 |
| R | Ex. 7[d] | Davidson | 75 | 13 |

*Not an example of the present invention.
[a] Percentage of asphalt remaining on the aggregate after boiling.
[b] The number of freeze-thaw cycles the asphalt concrete withstands before cracking.
[c] N.T. means that the formulation is not tested.
[d] Additives are employed at 0.5% by wt. of the asphalt.
[e] Additives are employed at 1.0% by wt. of the asphalt.

As seen in the above table, the reaction products of this invention improve both the boil test and freeze-thaw test results when incorporating into the asphalt 0.5% or 1.0% by weight on either Helms, Gifford-Hill, Waco or Davidson aggregate. Therefore, they are useful anti-stripping additives for asphalt.

We claim:

1. A composition which comprises a blend of
   (I) bituminous material and
   (II) the product resulting from reacting at conditions sufficient to complete the reaction of
       (A) at least one aromatic heterocyclic compound having one or more rings, at least one heterocyclic nitrogen atom and containing at least one group attached to a carbon atom in the heterocyclic ring selected from the group consisting of
           (1) carboxylic acid,
           (2) carboxylic acid ester,
           (3) acyclic carboxylic acid anhydride,
           (4) carboxylic acid halide or
           (5) combination thereof; with
       (B) an organic mine having at least one primary and secondary amine group or a combination of such groups and at least 4 carbon atoms; and wherein components (A) and (B) are present in quantities which provide a ratio of —CO— groups to —NH₂ or —NH— groups or a combination of such groups of from about 0.1:1 to about 1.2:1; and wherein components (I) and (II) are employed in quantities which provide from about 0.05 to about 10 percent by weight of component (II) based upon the combined weight of components (I) and (II).

2. A composition of claim 1 wherein
(a) component (A) is substituted pyrazine, substituted pyridine, substituted quinoline, substituted isoquinoline or substituted quinoxaline or any combination thereof;
(b) component (B) is an organic amine represented by the formulas

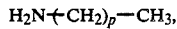

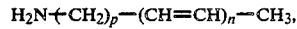

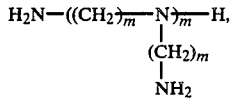

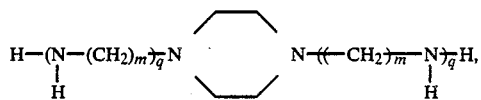

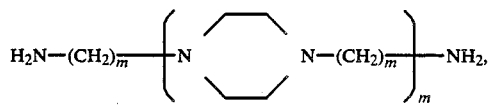

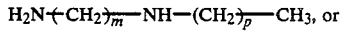

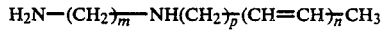

wherein each m independently has a value from 1 to about 10; each n independently has a value from 1 to about 5; each p independently has a value from 7 to about 72; each q independently has a value from zero to about 10; and wherein the carbon-carbon double bond (—CH=CH—) is located anywhere throughout the saturated hydrocarbon chain ((—CH₂—)p);
(c) components (A) and (B) are present in quantities which provide a ratio of —CO— groups to —NH₂ or —NH— groups or a combination of such groups of from about 0.75:1 to about 1.2:1,
(d) the product resulting from the reaction between components (A) and (B) is reacted or neutralized with (C) a mineral acid or an organic acid having from from about 1 to about 36 carbon atoms in an amount which provides a ratio of moles of mineral acid or carboxylic acid to reactive amine hydrogen atom present in said reaction product of from about 0.1:1 to about 2:1, and
(e) components (I) and (II) are employed in quantities which provide from about 0.25 to about 5 percent by weight of component (II) based upon the combined weight of components (I) and (II).

3. A composition of claim 2 wherein
(a) components (A) and (B) are present in quantities which provide a ratio of —CO— groups to —NH₂ and/or —NH— groups of from about 0.9:1 to about 1.1:1;
(b) component (C) is present in an amount which provides a ratio of moles of mineral acid or carboxylic acid having from 1 to about 36 carbon atoms to reactive amine hydrogen atoms present in said reaction product of from about 0.75:1 to about 1.5:1; and
(c) components (I) and (II) are employed in quantities which provide from about 0.5 to about 2.5 percent by weight of component (II) based upon the combined weight of components (I) and (II).

4. A composition of claim 3 wherein
(a) component (A) is pyrazinecarboxylic acid, 2-pyridinecarboxylic acid, 2,5-pyridinedicarboxylic acid, 2-pyridinecarboxylic acid ethyl ester, 4-pyridinecarbonyl chloride hydrochloride, pyrazinecarboxylic acid anhydride, pyrazinecarboxylic acid anhydride with ethyl hydrogen carbonate, or any combination thereof;
(b) component (B) is 1-decanamine, 1-undecanamine, 1-dodecanamine, 1-tridecanamine, 1-tetradecanamine, 1-pentadecanamine, 1-hexadecan-amine, 1-heptadecanamine, 1-octadecanamine, 9-octadecen-1-amine, 9,12-octadecadien-1-amine, 9,12,15-octadecatrien-1-amine, 9-eicosen-1-amine, octadecen-1,3-propanediamine, triethylenetetramine, tetraethylenepentamine, pentaethylenehexamine, or any combination thereof;
(c) component (C) is hydrochloric acid, acetic acid, propionic acid, or any combination thereof and is present in an amount which provides a ratio of moles of mineral acid or carboxylic acid having from 1 to about 24 carbon atoms to reactive amine hydrogen atoms present in said reaction product of from about 0.9:1 to about 1.1:1; and
(d) component (I) is AC5, AC10, AC20 or AC30 type asphalt or any combination thereof.

5. A composition of claim 1 which also contains an aggregate material.

6. A composition of claim 5 wherein the aggregate material is a siliceous material.

7. A composition of claim 2 which also contains an aggregate material.

8. A composition of claim 7 wherein the aggregate material is a siliceous material.

9. A composition of claim 3 which also contains an aggregate material.

10. A composition of claim 9 wherein the aggregate material is a siliceous material.

11. A composition of claim 4 which also contains an aggregate material.

12. A composition of claim 11 wherein the aggregate material is a siliceous material.

* * * * *

UNITED STATES PATENT AND TRADEMARK OFFICE
CERTIFICATE OF CORRECTION

PATENT NO. : 4,765,839

DATED : AUgust 23, 1988

INVENTOR(S) : Duane S. Treybig and Dane Chang

It is certified that error appears in the above-identified patent and that said Letters Patent is hereby corrected as shown below:

1st page, 2nd column, line 26; change "Pyridazine-4,5-discarboxylic" to --Pyridazine-4,5-dicarboxylic--.

Col. 2, line 53; change "near" to --neat--.

Col. 2, line 55; change "is" to --in--.

Col. 4, line 32; change "3-pyrazinecarboxylic" to --3-pyridazinecarboxylic--.

Col. 5, line 23; change "prepared" to --prepare--.

Col. 7, line 46; insert a comma --,-- after 2nd occurrence of "acid".

Col. 8, line 62; change "octdecanamine" to --octadecanamine--.

Col. 10, line 33; change "of" to --to--.

Col. 11, line 33; change "standarize" to --standardize--.

Col. 12, line 64, Claim 1; change "or" to --and--.

Col. 12, line 66, Claim 1; change "mine" to --amine--.

UNITED STATES PATENT AND TRADEMARK OFFICE
CERTIFICATE OF CORRECTION

PATENT NO. : 4,765,839

DATED : August 23, 1988

INVENTOR(S) : Duane S. Treybig and Dane Chang

It is certified that error appears in the above-identified patent and that said Letters Patent is hereby corrected as shown below:

Col. 12, line 67, Claim 1; change "and" to --or--.

Col. 13, line 54, Claim 2; delete 1st occurrence of "from".

Signed and Sealed this

Fourteenth Day of March, 1989

*Attest:*

DONALD J. QUIGG

*Attesting Officer*   *Commissioner of Patents and Trademarks*